152. RESILIENT TIRES AND WHEELS.
107

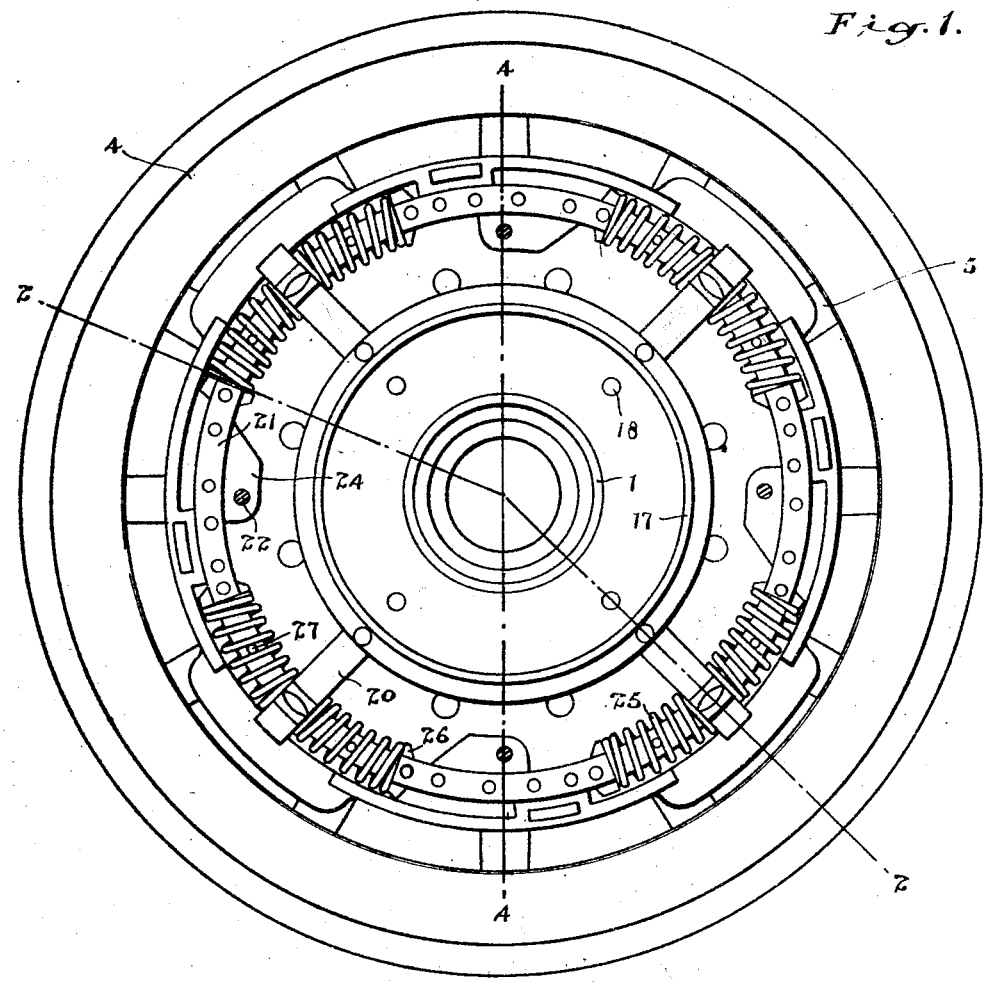
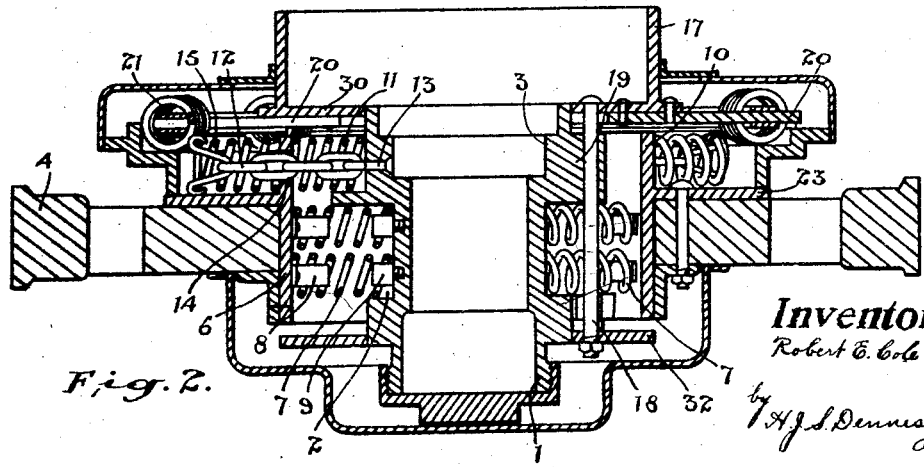

Aug. 25, 1925.

R. E. COLE 1,550,723

VEHICLE WHEEL

Filed April 19, 1920    3 Sheets-Sheet 2

Inventor.
Robert E. Cole,
by H. S. Dennis

Aug. 25, 1925.
R. E. COLE
1,550,723
VEHICLE WHEEL
Filed April 19, 1920   3 Sheets-Sheet 3
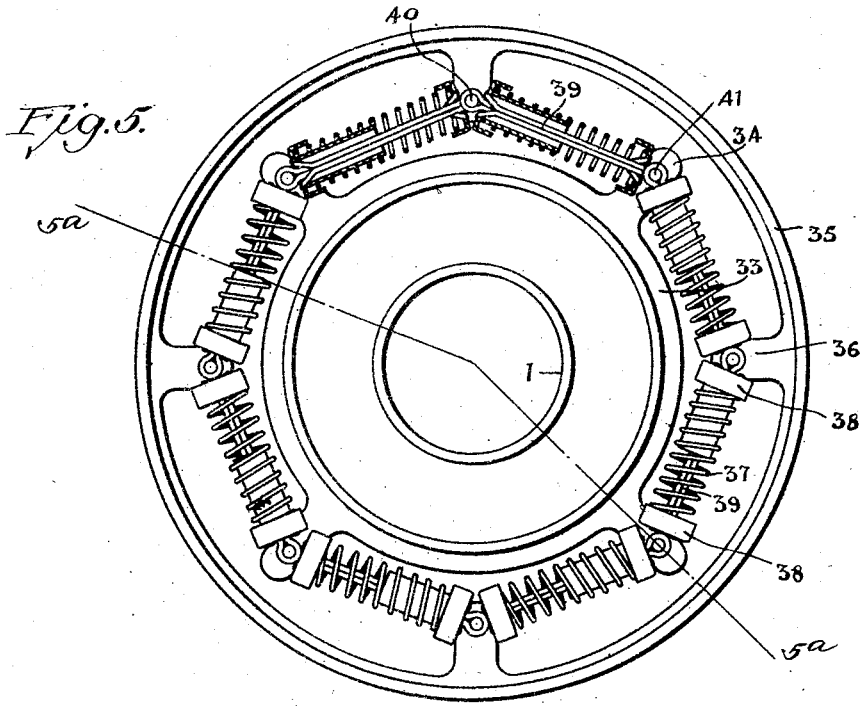
Fig. 5.
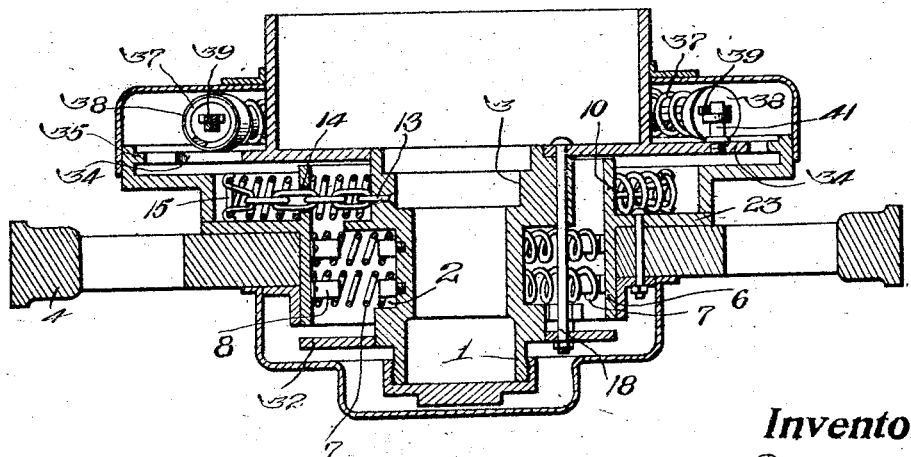
Fig. 5ª
Inventor.
Robert E. Cole
by H. J. S. Dennison
Atty.

Patented Aug. 25, 1925.

1,550,723

UNITED STATES PATENT OFFICE.

ROBERT E. COLE, OF HIGHLAND CREEK, ONTARIO, CANADA.

VEHICLE WHEEL.

Application filed April 19, 1920. Serial No. 375,072.

*To all whom it may concern:*

Be it known that I, ROBERT EDGAR COLE, a subject of the King of Great Britain, and resident of Highland Creek, county of York, Province of Ontario, in the Dominion of Canada, have invented certain new and useful Improvements in Vehicle Wheels, described in the following specification, and illustrated in the accompanying drawings, that form part of the same.

The principal objects of the invention are, to reduce the transference of vibration to the axles and mechanism connected therewith, caused by poor road surface conditions, thereby greatly reducing the wear and tear on the vehicle, and avoiding many of the conditions causing breakage and accidents.

A further and important object is to render the travelling conditions in motor vehicles more pleasant and safe.

A still further object is to relieve the stress upon the tires giving them greater efficient service.

The principal features of the invention consist in the novel construction and arrangement of parts, whereby the wheel hub is resiliently supported within the outer wheel structure upon a plurality of radially arranged compression springs arranged therebetween, and whereby a resilient torque transmission is maintained between the hub and outer wheel structure.

In the drawings, Figure 1 is a side elevational view of a wheel constructed in accordance with this invention with the inner dust cap removed.

Figure 2 is a sectional view taken on the line 2—2 of Figure 1.

Figure 5 is an elevational and part sectional view showing a modified form of driving or torque connection between the hub and outer wheel structure.

Figure 5ª is a sectional view through the line 5ª—5ª of Figure 5.

Figure 3:
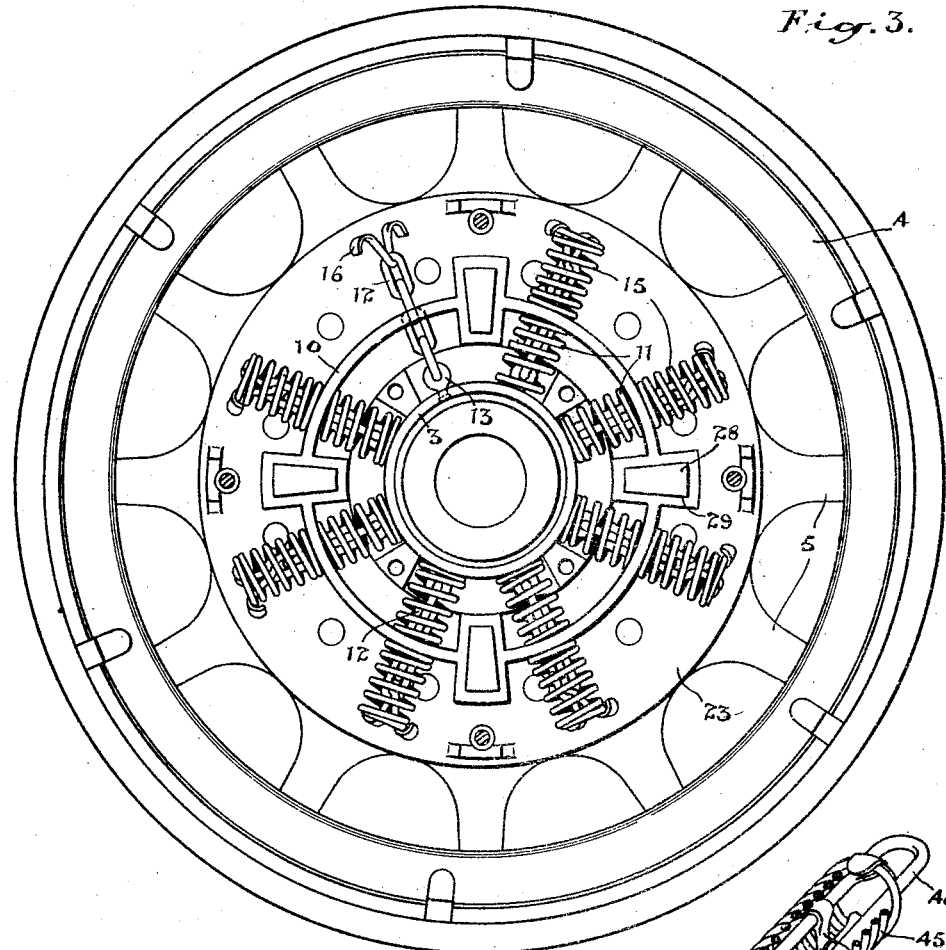
Figure 3 is an elevational view of a wheel showing the driving connection between the hub and the outer wheel structure, parts of the device being removed.
Figure 6:
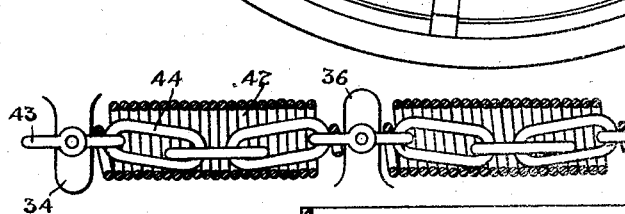

Figure 6 is an enlarged sectional detail of a further modified form of torque connection between the inner and outer portions of the wheel.

Figure 7:
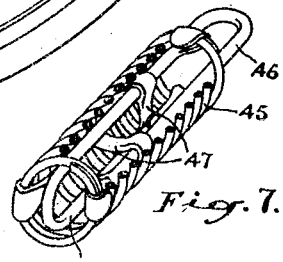
Figure 4:
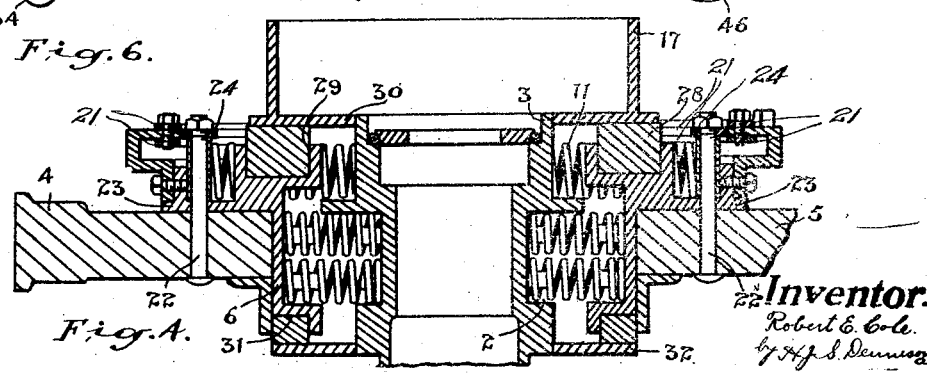
Figure 4 is a sectional view through the line 4—4 of Figure 1.

Figure 7 is a still further modified form of spring torque connection.

A great variety of forms of resilient wheels have been proposed with the principal idea of eliminating the necessity for use of the pneumatic tires. It is found by extensive experiment that the main feature of importance in the use of a spring wheel is to eliminate the transference of the minor shocks and vibrations of the wheel upon the road surface to the parts directly supported by the wheels, that is the axles and driving members.

The vibratory effect of the road conditions upon the axles of a motor car and particularly the back axle is very destructive. The pneumatic tire absorbs a certain amount but in order to sustain the great weight of the car and its load the tire is required to be maintained at a very high pressure and the minor inequalities in the road cause a rapid vibratory condition which disintegrates the metal causing many troubles and the direct shock of the wheels dropping into a hole when opposed to the weight of the transmission gear, frequently causes the breaking of an axle. The present construction has had remarkable tests in road service extending over a considerable period of time and the results achieved demonstrate the peculiar advantages to be obtained.

In the construction herein shown the axle hub 1 is secured to the wheel axle in the usual manner and therefore carries the weight of the transmission when used as a rear wheel. This hub is formed with an annular recess 2 and an inner horizontally arranged flange 3.

The outer wheel structure comprising the felly 4 and spokes 5 has secured on the inner periphery a ring 6 which is spaced from the hub 1. A plurality of compression springs 7 are radially arranged within the annular recess 2 of the hub to extend outwardly and engage the inner wall of the ring 6, said ring having the inwardly projecting guide members 8 securely fastened to its inner periphery and arranged in radial alignment with the studs 9 secured to the peripheral surface of the recess 2 of the hub. These projecting members hold the springs in their radial positions preventing displacement. It will be seen that there are two complete rows of the springs 7.

The ring 6 is formed with a circular flange 10 projecting laterally beyond the spoke holding portion and extending over the flange 3 of the hub.

A plurality of compression springs 11 are radially arranged between the flanges 3 and 10. These are held in place by flexible members 12 here shown in the form of chains having the inner end piece 13 securely riveted in the flange 3. The chains extend through the springs 11 and through holes 14 in the flange 10 and springs 15 similar to the springs 11 are arranged on the outer side of the flange 10 being secured in place by the end links 16 of the flexible members 12.

The downward pressure of the weight upon the axle is supported by the compression springs 7 and 11 and in addition the springs 15 on the upper side of the wheel also assist in supporting the load through the flexible members 12.

It will be noted that with such an arrangement of radial supporting springs a very strong support may be given by a construction which is exceedingly compact, but such construction would not suffice for a complete wheel, because the rotative action either of the hub in one direction or of the outer wheel structure in the other direction would simply pull the radial springs out of line and destroy the whole structure.

It is therefore necessary to provide a proper connection between the hub structure and the outer wheel structure which will transmit a rotative force applied to either or a retarding force applied to either as the case may be. Many different forms of driving connection between the hub and the outer wheel structure may be devised, but they must of necessity be resilient.

In Figures 1 and 2 I show a brake drum 17 encircling the inner end of the hub and secured by the bolts 18 which extend through the bosses 19 formed on the inner end of the hub.

A plurality of radial arms 20 are secured to or form part of the drum structure and extend outwardly toward the periphery of the wheel.

A ring 21 is secured by means of bolts 22 to the outer wheel structure passing through the flange 23 of the ring 6. The said ring 21 is formed of a pair of bars spaced apart by the plates 24 through which the bolts 22 pass and the ends of the radial arms 20 extend between the members of said ring 21 and are adapted to move freely therebetween.

Spiral compression springs 25 are arranged to encircle the ring 21 on either side of each of the arms 20 abutting fixed stops 26 at the outer end and at the inner ends engaging the radial arms 20.

Any rotative movement of the hub effects a corresponding movement of the radial arms and such movement is transmitted to the outer wheel structure through the medium of the compression springs in either direction of rotation. Consequently the stress of applied power for driving the wheel is imparted to the outer portion of the wheel through the yielding medium of the springs. Positive stops limit the rotative movement of the hub in relation to the outer wheel structure and are shown in the form of pins 27 extending across the members of the ring 21 so that when the arms have moved a certain distance rotatively they will come in contact with said stops. This prevents an overstrain being placed upon the springs and such stops only come into operation under excessive stress. The application of power to the wheel is thus effected in the most desirable manner through the resilient medium and the shock of the definite connection of the driving mechanism is not directly imparted to the driven periphery of the wheel. This feature reacts when the brake is applied or when the motion of the wheel is reversed.

The radial arms allow the outer wheel structure to move freely in relation to the hub centre upon the supporting springs 7 and 11 and a very flexible wheel is produced. The outer wheel structure is held from lateral movement by means of rubbing blocks 28 arranged in pockets 29 formed on the ring structure 6, said rubbing plates engaging the inner flange 30 of the brake drum.

Outside rubbing blocks are arranged in the recesses 31 in the ring 6 which engage the plate 32 connected by the bolts 18. These rubbing blocks are preferably of wood but may be anti-friction material of any desirable form.

In the form of driving connection between the hub and the outer wheel structure shown in Figure 5 a ring 33 corresponding with the brake drum and preferably part thereof is formed with radial arms 34 and a ring 35 is secured to the outer wheel structure having inwardly extending radial arms 36, the latter arms being arranged equidistant between the arms 34. Between these alternately arranged arms are placed an arrangement of spiral compression springs 37.

Each of the springs 37 is supported between end caps 38 and to each of said end caps is secured a double rod 39, the looped ends of which are arranged at the opposite end of the spring. The looped ends of the rods 39 adjacent to the arms 36 encircle the pins 40 on said arms 36 and the opposite looped ends encircle the pins 41 on the arms 34.

When the inner ring is rotated the springs to the forward side of each of the arms 34 are compressed by direct compression while the rods extending to the other side are pulled upon and compress the springs at the opposite side, thus effecting a spring pushing effect against one side of the arm on the ring 35 and a resilient pulling effect upon the other side. This form of spring drive connection between the hub and outer wheel structure is very positive and compact.

In the form shown in Figure 6 is illustrated a further modified form of driving connection between the inner and outer wheel structure consisting of a series of spiral tension springs 42 each connected at the ends to the links 43 secured to the arms 34 and 36. The said links are connected by chain links 44 which extend through the centre of the springs and ordinarily lie loosely therein. These inside links provide the limiting feature for preventing the undue elongation of the springs.

A further form of spring connection to be placed between the arms 34 and 36 is shown in Figure 7 where a coil compression spring 45 has arranged in the interior thereof U-shaped rods 46 having the looped ends arranged at the opposite ends of the spring to be connected to the arms. Cross bars 47 are formed on these loops intermediate of their length so that the cross bars will engage when the spring has been compressed to the desired limit.

In the use of this wheel the load is supported by the compression springs at the lower side of the hub within the central recess and inside of the flange 10 and also by the compression springs on the upper and outer side of said flange that are connected with the flexible chain connections and such springs normally retain the hub centre concentric with the periphery of the wheel if the wheel is travelling on a smooth surface. When inequalities in the road surface are met the shock of striking an obstruction is absorbed by these springs and prevent it reaching the hub and in actual practice on a rough road surface the outer structure of the wheel will be constantly changing its position in relation to the hub and the constant vibratory movement of the outer wheel structure will not be transmitted to the hub, and the axles and other structure supported thereby will be freed from the detrimental effects of such vibration.

As the rotation of the hub is required to be transmitted to the outer wheel structure from the driving axle it will be quite readily understood that a constant connection is required to be maintained between such portions of the wheel and it will also be readily seen that such connections must be resilient to allow for the constant change of relative position. This is accomplished by the arrangement of spring structures described which illustrate certain forms though it will be readily understood that other forms may be devised.

The arrangement of a resilient torque connection between the hub and the outer wheel structure is important from another aspect and that is in automobiles where a constantly operating engine is brought into operating connection with the gears by means of a clutch. There is a period of slip in the clutch which frequently fails to function and results in a seizing action which imparts a very rigorous transference of the motive power to the wheels and where a resilient torque connection is used such sudden movement in the transmission will be absorbed in the resilient torque connection and the car will move off smoothly. This resilient torque connection is also important from the view point of braking as the springs will automatically relieve if the car is braked too hard as the braking occurs on the central portion.

The spring mechanism shown is of a very compact nature and is enclosed with suitable dust caps to maintain the parts in a well lubricated state and free from dust and dirt.

What I claim as my invention is:—

1. In a vehicle wheel, an axle hub, a cylindrical member spaced from and encircling said hub and having spoke sockets in the periphery, radial compression springs arranged between the axle hub and the encircling cylinder, radial compression springs arranged outside said cylinder, flexible members secured in the axle hub and extending outwardly through said outwardly arranged springs and secured at their outer ends to the outer ends of said outwardly arranged springs, radial arms extending from said axle hub, and resilient means connecting said radial arms with said cylinder.

2. A vehicle wheel having a resiliently supported centre characterized by the centre structure having radial arms extending outwardly and the outer wheel structure having inwardly extending radial arms spaced between the arms of the centre, a pair of rods pivotally secured to each of said arms, the rods of one set overlapping the rods of the other set, spiral compression springs encircling said overlapping rods, and caps abutting the ends of the springs and secured to the free ends of the overlapping rods.

R. E. COLE.